Patented July 25, 1933

UNITED STATES PATENT OFFICE 1,919,304

HEINRICH REITZ, OF BITTERFELD, AND HANS EHLERS, OF SANDERSDORF, GERMANY, ASSIGNORS, BY MESNE ASSIGNMENTS, TO PEN-CHLOR, INCORPORATED, OF PHILADELPHIA, PENNSYLVANIA, A CORPORATION OF DELAWARE

RECOVERY OF CALCIUM HYPOCHLORITE

No Drawing. Application filed November 13, 1930, Serial No. 495,520, and in Germany November 15, 1929.

The present invention relates to improvements in the recovery of dry neutral calcium hypochlorite from moist neutral calcium hypochlorite crystals.

For the purpose of drying and dehydrating calcium hypochlorite it has been proposed to effect the drying in vacuo or by means of heated air. Drying in vacuo yields a practically anhydrous product, but has the disadvantage of necessitating discontinuous working and of requiring apparatus which is resistant to chlorine, as some chlorine is always expelled with the moisture. On the other hand, also drying by means of heated air does not yield a satisfactory product in a one-step process, so that it is always necessary to subject the product to a second drying stage in order to obtain a practically anhydrous product. A process combining the drying by heated air with the drying in vacuo, although yielding a dry final product, is equally disadvantageous owing to the fact that it also necessitates discontinuous working and causes losses, for instance, by the formation of dust.

It is an object of the present invention to remove the moisture contained in neutral calcium hypochlorite by a simple one-step process without the application of reduced pressure and at the same time, to produce dry neutral calcium hypochlorite in an extremely stable form with a minimum loss by decomposition.

We have observed that it is practically impossible to remove the last traces of water from calcium hypochlorite crystals by the application of temperatures such as were hitherto exclusively employed. On the other hand, we have observed that perceptibly higher temperatures, such as would be required to eliminate also the last traces of water, when applied to the moist starting material, result in a rapid decomposition of the latter. According to the present invention, we therefore first subject the moist starting material, without employing a vacuum, to a comparatively moderate temperature, say between 90 and 100° C., and then in the measure in which the water of crystallization is driven off, rapidly raise the temperature up to a range between about 160 and 170° C. In order to reduce the period of time during which the hypochlorite is exposed to such temperatures as much as possible, we subject the hypochlorite to heated air in a state of extremely fine subdivision by consecutively suspending it in currents of air heated to the required temperatures.

A preferable mode of carrying out our invention is as follows:

Powdered crystals of moist neutral calcium hypochlorite are, by means of a blower or similar device, disseminated in dry air having a temperature of about 140–150° C. Owing to the immediate evaporation of comparatively large quantities of water the product assumes a temperature of not more than about 90–100° C. which temperature is, in view of the short time of contact, still insufficient to cause perceptible decomposition; thus the greater part of the water contents of the product is evaporated. The product suspended in this current of heated air containing water of evaporation is then immediately taken up by a fresh current of dry air heated to about 160–170° C. As nearly all the water contained in the product has already been evaporated, the product rapidly assumes a temperature closely approaching the temperature of the freshly introduced air, so that even the last traces of moisture or of water of crystallization are rapidly removed. The dehydrated salt is then immediately separated from the heated air and cooled to normal temperature so as to avoid a prolonged action of high temperature upon the product which would necessarily result in immediate or subsequent decomposition.

The product obtained is entirely anhydrous and the chlorine losses occurring in the treatment do not exceed about 1 or 2 percent of the original chlorine content.

We claim:

A process for removing water from calcium hypochlorite which comprises suspending moist neutral calcium hypochlorite crystals in a state of extremely fine subdivision in a current of dry air heated to between about 140–150° C. for a period of time sufficient to remove the greater part of the water contained in said crystals, then exposing the product immediately to a fresh current of dry air heated to between about 150–160° C. for a period of time sufficient to complete dehydration, and finally cooling the product.

HEINRICH REITZ.
HANS EHLERS.